US008473727B2

(12) United States Patent
Dunn et al.

(10) Patent No.: US 8,473,727 B2
(45) Date of Patent: *Jun. 25, 2013

(54) HISTORY BASED PIPELINED BRANCH PREDICTION

(76) Inventors: David A. Dunn, Sammamish, WA (US); John P. Banning, Sunnyvale, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 12/851,906

(22) Filed: Aug. 6, 2010

(65) Prior Publication Data

US 2012/0072708 A1    Mar. 22, 2012

Related U.S. Application Data

(63) Continuation of application No. 11/786,336, filed on Apr. 10, 2007, now Pat. No. 7,779,241.

(51) Int. Cl.
*G06F 9/42* (2006.01)

(52) U.S. Cl.
USPC .......................................... 712/239; 712/240

(58) Field of Classification Search
None
See application file for complete search history.

(56) References Cited

U.S. PATENT DOCUMENTS

| | | | |
|---|---|---|---|
| 4,858,104 A * | 8/1989 | Matsuo et al. | 712/240 |
| 5,577,217 A | 11/1996 | Hoyt et al. | |
| 5,764,946 A * | 6/1998 | Tran et al. | 712/239 |
| 5,935,241 A | 8/1999 | Shiell et al. | |
| 5,978,909 A | 11/1999 | Lempel | |
| 6,189,091 B1 | 2/2001 | Col et al. | |
| 6,233,679 B1 | 5/2001 | Holmberg | |
| 6,247,122 B1 | 6/2001 | Henry et al. | |
| 6,272,624 B1 | 8/2001 | Giacalone et al. | |
| 6,427,206 B1 | 7/2002 | Yeh et al. | |
| 6,918,033 B1 | 7/2005 | Cho | |
| 7,139,903 B2 * | 11/2006 | Seznec et al. | 712/239 |
| 2001/0021974 A1 | 9/2001 | Lee | |
| 2005/0027975 A1 | 2/2005 | Frommer et al. | |
| 2005/0216714 A1 * | 9/2005 | Grochowski | 712/240 |
| 2005/0278513 A1 | 12/2005 | Aristodemou et al. | |
| 2006/0015706 A1 | 1/2006 | Lai | |

OTHER PUBLICATIONS

Jimenez, Daniel, Reconsidering Complex Branching Predictors, 2002, IEEE, Proc. of Ninth Int. Symposium of High-Performance Computer Architecture, 10 pages.*
Tarjan, David, etal., An ahead pipelined alloyed perceptron with single cycle access time, 2004, cs.virginia.edu. pp. 1-8.*
McFarling, Scott, Combining Branch Predictors, 1993,Digital Western Research Lab, 22 pages.*
Yeh,Tse-Yu et al., "Alternative Implementations of Two-Level Adaptive Branch Prediction," ACM, Jan. 1992, pp. 451-461.

* cited by examiner

*Primary Examiner* — Eric Coleman

(57) ABSTRACT

Systems and methods for history based pipelined branch prediction. In one example, access to prediction information to predict a plurality of branches within an instruction block is initiated in a same clock cycle of the computer processor as a fetch of the instruction block. The prediction information may be available to the predictor not later than a clock cycle of the computer processor in which the plurality of branches are decoded.

19 Claims, 5 Drawing Sheets

HISTORY BASED PIPELINED BRANCH PREDICTION

RELATED APPLICATION

This application is a Continuation Application of, and claims priority to, commonly owned U.S. patent application Ser. No. 11/786,336, now U.S. Pat. No. 7,779,241, filed Apr. 10, 2007 to Dunn and Banning, which is incorporated herein by reference in its entirety.

FIELD OF INVENTION

Embodiments in accordance with the present invention relate to the field of branch prediction in computer processors. More specifically, embodiments of the present invention pertain to history based pipelined branch prediction.

BACKGROUND

Within computer instruction processing, branch prediction generally requires an access into an array of prediction information. For many prediction systems and methods, the location of the information within the array depends on recent history of branch behavior. While such an array is typically stored within a processor, e.g., a microprocessor, accessing the array is not instantaneous, e.g., such an access may take a few clock cycles. Unfortunately, such a prediction array access time increases the time required for a branch prediction to update an instruction fetch unit. For example, predicting a branch to be taken generally places a new, non-consecutive address into the fetch unit of an instruction pipeline. As an unfortunate result, such increased update time also increases the duration of an instruction pipeline stall for a "branch taken" prediction.

SUMMARY OF THE INVENTION

Therefore, a need exists for systems and methods for history based pipelined branch prediction. A need also exists for systems and methods for improving a cycle time of history based predictions that also satisfies the above need. A further need exists for systems and methods for history based pipelined branch prediction that are compatible and complementary with existing systems and methods of processor design and branch prediction. Embodiments in accordance with the present invention provide for these needs.

Embodiments in accordance with the present invention provide for overlapping a branch prediction information fetch with an instruction block fetch for a history based predictor.

Accordingly, systems and methods for a history based branch predictor of a computer processor are disclosed. In one embodiment, access to prediction information to predict a plurality of branches within an instruction block is initiated in a same clock cycle of the computer processor as a fetch of the instruction block.

In accordance with another embodiment of the present invention, a computer processor includes a history based branch predictor. The predictor includes circuitry to predict at least two branches based on a single access to a single ported memory comprising prediction information.

In accordance with an alternative embodiment of the present invention, an apparatus for maintaining history information for a history based branch predictor of a computer processor includes a first memory for storing a not taken invariant portion of the history information and a second memory for storing a not taken variant portion of the history information.

In accordance with a method embodiment of the present invention, a method for maintaining history information for a history based branch predictor of a computer processor includes responsive to a branch not taken prediction, maintaining a not taken invariant portion of the history information in an unchanged condition. Responsive to the branch not taken prediction, a not taken variant portion of the history information is modified. Responsive to a branch taken prediction, the not taken invariant portion of the history information is changed.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings are not to scale.

DETAILED DESCRIPTION

Reference will now be made in detail to various embodiments of the present invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

HISTORY BASED PIPELINED BRANCH PREDICTION

Figure 1:
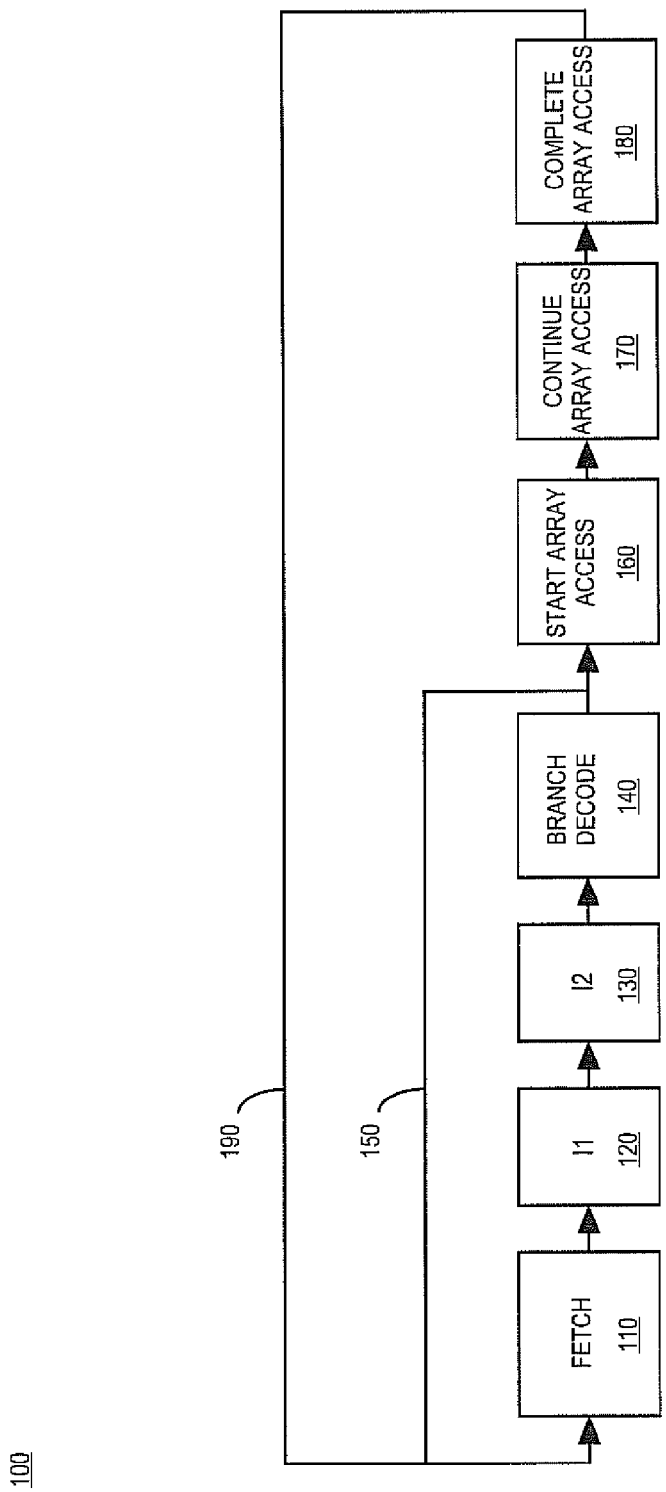
FIG. 1 illustrates an exemplary portion of an instruction pipeline, in accordance with embodiments of the present invention.

FIG. 1 illustrates an exemplary portion of an instruction pipeline 100, e.g., implemented within a processor, in accordance with embodiments of the present invention. Each block or "pipestage" 110-140 of pipeline 100 generally executes in a single clock cycle with data moving in between the blocks in a synchronous fashion. In 110, a fetch of a block of instruction information is initiated. The block may be fetched from any memory coupled to a processor. However, such an instruction fetch is more generally made from an instruction cache (Icache).

The instruction block generally corresponds to multiple words of memory, for example, a cache line of 32 bytes, although this is not required. The instruction block may comprise a plurality of potential branch instructions, e.g., branches in program flow. For example, in many reduced instruction set (RISC) processors, each word in an instruction block may usually may contain a single branch instruction. In many complex instruction set (CISC) processors, instructions vary in size and an instruction block may contain many branch instructions. In very long instruction word (VLIW) processors, some or all of the words in an instruction block may contain branch instructions.

In units 120 and 130, the instruction block is accessed, e.g., from an instruction cache. By unit 140, enough of the instruction block has been decoded such that potential branch instructions and their branch addresses have been identified. It is desirable to predict the branches at this pipestage in processing. For example, at unit 140 it is desirable to predict whether or not a conditional branch instruction will cause program flow to take a branch. If a "branch taken" prediction is made, the branch prediction is communicated via feedback path 150 to fetch unit 110. For example, if the branch is predicted to be taken, fetch unit 110 is provided the branch address.

Branch prediction generally requires an access into an array of prediction information. For example, typical prediction information may comprise two bits per conditional branch instruction: a "prediction" bit, e.g., "0" for a not taken prediction and "1" for a taken prediction, and a "strength of prediction" bit, e.g., "0" for a weak prediction and "1" for a strong prediction. Such information is utilized to predict whether a conditional branch will be taken. It is appreciated that embodiments in accordance with the present invention are well suited to a wide variety of prediction techniques, as well as varying amounts and characteristics of information stored in a prediction array.

Unfortunately, access into the prediction array is not instantaneous, e.g., such an access may take a few clock cycles. Thus, under the conventional art, a prediction cannot be made at pipestage 140. Rather, a prediction may be made after accessing the prediction array, at some time after pipestage 140. For example, if accessing a prediction array requires three clock cycles, then a prediction may be made after units 160 and 170, at pipestage 180. The branch prediction is communicated via feedback path 190 to fetch unit 110.

It is appreciated that instruction pipeline 100 continues to fetch new instruction blocks each clock cycle in a pipelined fashion. For example, when a first instruction block has progressed to unit 120, unit 110 is initiating a fetch of a second instruction block, generally the next sequential block in memory. Therefore, by the time a branch prediction is made at pipestage 180, six more instruction blocks have been loaded into pipeline 100, based on an assumption of continuous instruction flow, e.g., no branching. If the prediction made at pipestage 180 is to take the branch, those six instructions already in the pipeline are wasted; the pipeline must be flushed, and instruction execution stalls. Further, no more branch predictions may be made until the new instruction block propagates to pipestage 180.

Thus, in accordance with embodiments of the present invention, it would be beneficial to begin accessing a prediction array prior to the branch decode stage, such that prediction array information is available in time for prediction at the branch decode stage. For example, it is desirable to begin accessing a prediction array coincident with fetching an instruction block.

However, history based branch prediction utilizes information of a branch address and history information of the behavior of recent branches. For example, an index into a prediction array may generally be a function, e.g., a hash, related to the address of the branch being predicted and a branch history. Branch history generally indicates a sequence of taken/not taken events for a specific branch, or a taken/not taken sequence for all recent branches. In general, the taken/not taken history of the most recent branch instructions is more valuable than older history in forming more accurate predictions of branch behavior.

Unfortunately, the most recent branch predictions are not available coincident with fetching an instruction block. For example, at unit 110, the fetch unit is accessing a first instruction block. However, a second instruction block, which most likely immediately preceded the first instruction block, is at unit 120. A third instruction block, which most likely immediately preceded the second instruction block, is at unit 130, and so on. Consequently, the most recent instruction blocks, which in general comprise the most recent branch instructions, are still in the early stages of the instruction pipeline and have yet to be predicted. Therefore, there is generally no history information for such recent branches available at the fetch time of the first instruction block. Accordingly, such unavailable recent branch history information cannot be combined with the current branch address in order to obtain the relevant prediction information in a timely manner, under the conventional art.

In accordance with embodiments of the present invention, it is not necessary to utilize the actual predictions corresponding to those instruction blocks still in the pipeline. Rather, the most recent available history, e.g., corresponding to instructions that have actually been predicted, is utilized. In accordance with embodiments of the present invention, a prediction can be made based on an assumption that those branches still in the pipeline and yet to be predicted will not be taken. For example, the unknown portion of the branch history is assumed to comprise "not taken" indications corresponding to the branches yet to be predicted.

For example, with reference once again to FIG. 1, a first instruction block is fetched at pipestage 110. A second instruction block is at 120, and a third instruction block is at pipestage 130. The branch behavior of neither the first, second nor third instruction blocks has been predicted. Embodiments in accordance with the present invention assume that no branch within the second or third instruction blocks will be predicted as taken.

It is to be appreciated that if this assumption is incorrect, e.g., a branch not yet predicted is ultimately predicted to be taken, then the instruction blocks following the prediction of a taken branch instruction are invalid. For example, the third, second and first instruction blocks follow the instruction block at unit 140 in sequence. One function of a prediction to take a branch is to load a new, non-sequential address into unit 110. Consequently, the pipeline must be flushed, and the third, second and first instruction blocks are no longer valid. Thus, any branch prediction made based on this assumed history will not be used, and there is no detrimental result of an incorrect assumption.

Figure 2:
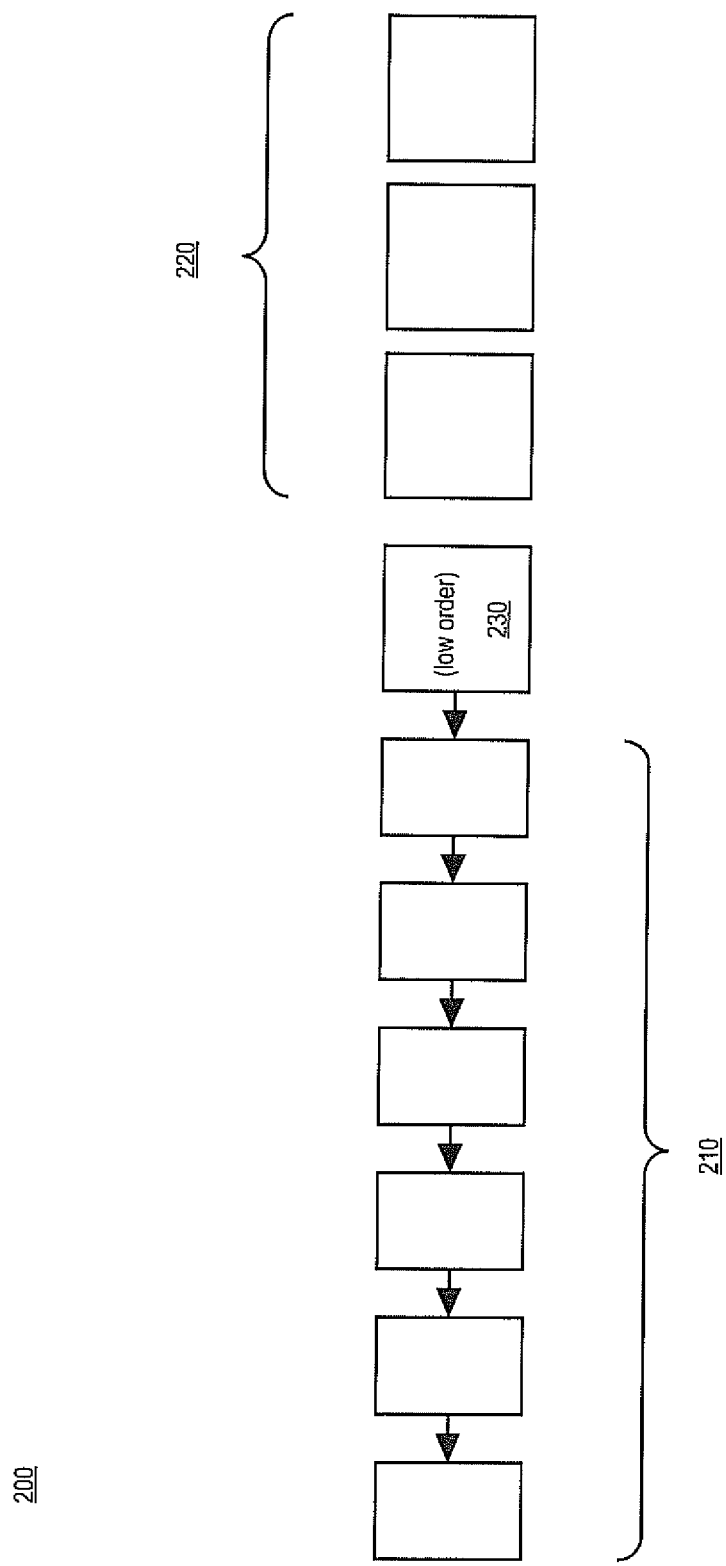
FIG. 2 illustrates an exemplary history encoding, in accordance with embodiments of the present invention.

FIG. 2 illustrates an exemplary history encoding 200, in accordance with embodiments of the present invention. History encoding 200 comprises a shift field 210 and a counting field 220. Shift field 210 may be implemented as a shift register, but that is not required. Similarly, counting field 220 may be implemented as a latch-based counter, but this is not required. It is appreciated that the sizes of shift field 210 and counting field 220 are exemplary, and that embodiments in accordance with the present invention are well suited to variations in the size of either field.

In one embodiment, counting field 220 is saturable. For example, counting field 220 may be incremented until its maximum binary value is reached, e.g., "111" in the embodiment of FIG. 2. Additional instructions to increment counting field 220 will not cause a roll over or a carry.

In accordance with embodiments of the present invention, history encoding 200 comprises a first portion that does not change for predictions of branches not taken, and a second portion that does change for predictions of branches not taken. The first portion may be described as not taken invariant, and the second portion may be described as not taken variant. Shift field 210 does not change for predictions of branches not taken. However, a prediction of a not taken branch increments counting field 220.

In one embodiment, a "0" value in shift field 210 indicates a historical branch prediction of not taken, while a "1" value in shift field 210 indicates a historical branch that was predicted to be taken. A current branch taken prediction shifts in, via low order bit 230, a number of not taken indications, e.g., "0" values, equal to the number of consecutive predictions of branches not taken, e.g., the value of counting field 220. For example, if the value of counting field 220 was three ("011"), then three zeros would be shifted into shift field 210. A taken indication, e.g., a "1," is shifted into low order bit 230 corresponding to the current branch taken prediction. The counting field 220 is reset to a zero value, e.g., "000," by the prediction of a branch taken.

Figure 3:
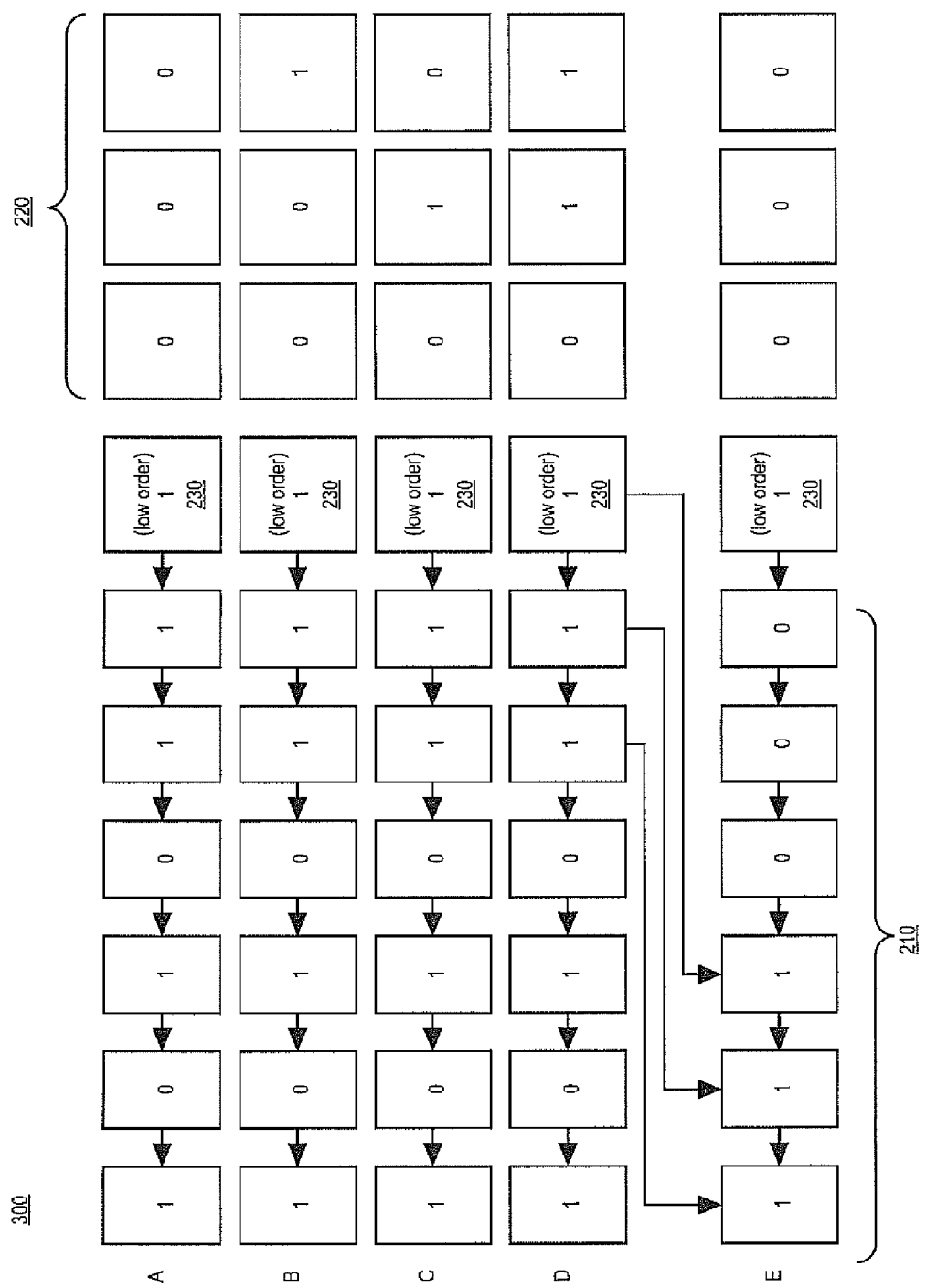
FIG. 3 illustrates exemplary operation of the history encoding of FIG. 2, in accordance with embodiments of the present invention.

FIG. 3 illustrates exemplary operation of history encoding 200 of FIG. 2, in accordance with embodiments of the present invention. In state A of FIG. 3, shift field 210 contains a history of branch predictions to be taken and not to be taken. In this state, counting field 220 contains a count of zero, indicating that the most recent prediction was to take a branch.

In state B of FIG. 3, responsive to a prediction not to take a branch, counting field 220 is incremented. However, shift field 210 remains unchanged. In state C of FIG. 3, responsive to a prediction not to take a branch, counting field 220 is incremented. Again, shift field 210 remains unchanged. Similarly, in state D of FIG. 3, responsive to a prediction not to take a branch, counting field 220 is incremented. Again, shift field 210 remains unchanged.

In state E of FIG. 3, responsive to a prediction to take a branch, counting field 220, which contained the value three, is reset to zero. The contents of shift field 210 have been shifted left by four, e.g., the value of counting field 220 plus one. Three zeros have been shifted into counting field 220, corresponding to the number of not taken branch predictions counted in counting field 220. A one value is shifted into low order position 230 to indicate that the most recent prediction was to take a branch.

In accordance with another embodiment of the present invention, the low order bit of the shift register field 210 is always a "branch taken" prediction, e.g., a one (1) value in the exemplary embodiment, as the shift register is only changed when the last branch is a taken branch. Thus, in one embodiment, this bit does not need to be explicitly represented or to be included in the hash function that accesses the prediction array.

In general, the shift field, e.g., shift field 220, is modified as a function of a count of branch not taken predictions, e.g., a value of counting field 220, in response to a branch taken prediction. Embodiments in accordance with the present invention are well suited to a wide variety of modifications of a not taken invariant portion of history encoding, responsive to a branch taken prediction. For example, a greater or lesser, e.g., one or half of the count value, number of branch not taken indications, e.g., zeros in the present exemplary embodiment, may be shifted in to shift field 120, and accounted for in other logic. Alternatively, a head pointer may be adjusted, responsive to a branch taken prediction. Many such modifications are possible, and all such embodiments are considered within the scope of the present invention.

It is appreciated that branch prediction generally requires accessing a prediction array, and an index into the prediction array may generally be a function, e.g., a hash, of the address of the branch being predicted and a branch history. For example, an index may be determined as follows:

$$\text{prediction array index} = \text{address}[M:3] \text{ XOR } \text{history}[N:0] \quad \text{(Relation 1)}$$

where address [M:3] is the high order address bits of the branch to be predicted, and history [N:0] is a vector of historical branch taken/not taken predictions. Embodiments in accordance with the present invention are well suited to the use of other hashing functions to combine branch address with history information.

In accordance with embodiments of the present invention, counting field 210 (FIG. 2) may be used as the high order bits in a history vector for use in determining an index into a prediction array. While the low order bits are unknown because they represent predictions that have not yet been made, the high order bits are stable, based on the assumption of branches not taken, as previously described. As an advantageous result, the high order bits of a history vector are available at the time an instruction block is fetched.

It is to be appreciated that, with the high order bits of a history vector fixed, the uncertainty of the exact vector is limited to the low order bits. For example, there is an uncertainty equal to the size of counting field 220 (FIG. 2), e.g., three bits in that exemplary embodiment. In addition, there may be uncertainty in the number of branch instructions contained within an instruction block.

In general, the uncertainty of such a history vector is the ceiling function (least integer greater than or equal to) of $\log_2$ of the number of possible branch instructions in an instruction block, e.g., an Icache line fetch, plus the number of bits in a counting field, e.g., counting field 220.

In an exemplary very long instruction word, VLIW, processor, there may be up to four branches within an instruction block. For this example, uncertainty in the number of branch instructions adds two bits of uncertainty to the history vector. Thus, in an exemplary embodiment, there are five bits of uncertainty in the history vector.

The exemplary five bits of uncertainty in the history vector corresponds to 32 entries in the prediction array. In accordance with embodiments of the present invention, an access of all possible array entries indexed by the high order bits, e.g., all 32 entries of the present exemplary embodiment, will include the proper entry.

While the full history, and hence the exact prediction array index, are not known at the time of an instruction block fetch, the exact prediction array index is known with a certain level of uncertainty at that time. Beneficially, the set of all possible indexes, given the fixed high order history bits, is relatively small, based on the uncertainty of the low order history bits. In accordance with embodiments of the present invention, an access of all possible prediction array values is initiated at the time of an instruction block fetch.

Figure 4:
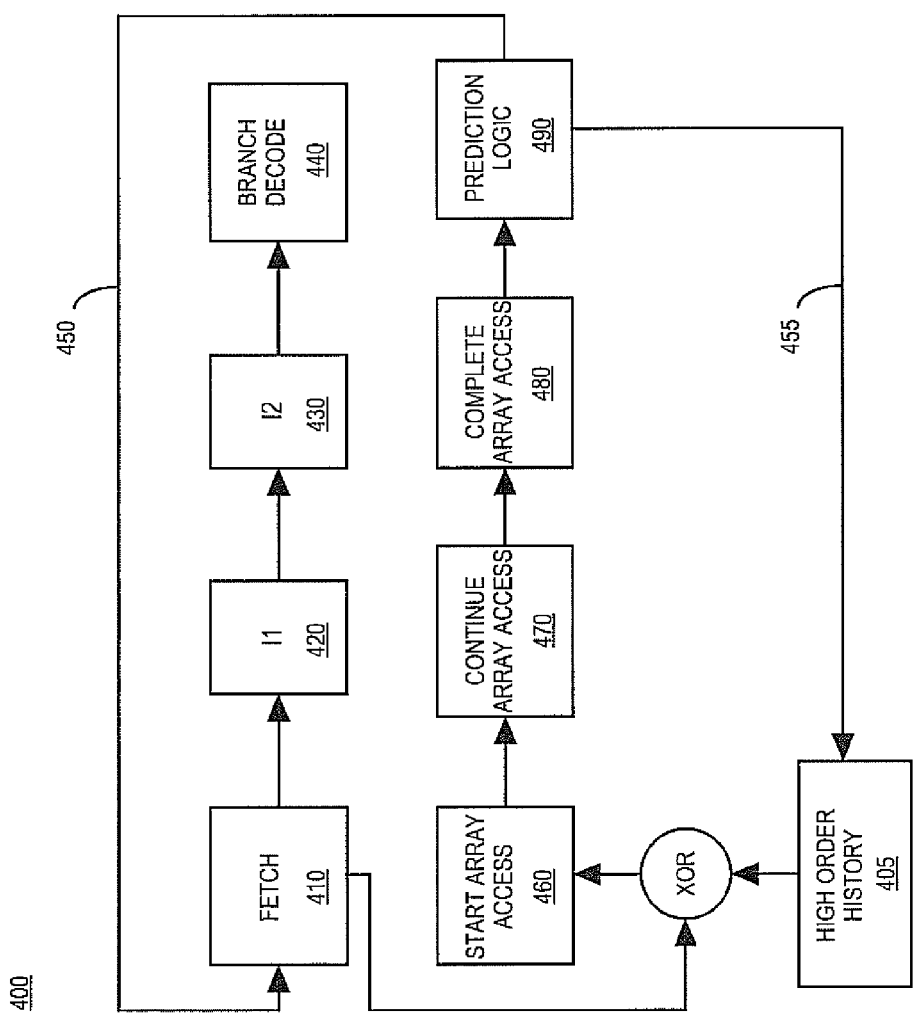
FIG. 4 illustrates an exemplary portion of an instruction pipeline, in accordance with embodiments of the present invention.

FIG. 4 illustrates an exemplary portion of an instruction pipeline 400, in accordance with embodiments of the present invention. Each block 410-440 of pipeline 400 is generally similar to blocks 110-140 of FIG. 1. In block 410, an instruction block fetch is initiated. In block 440, the instruction block has been decoded sufficiently to identify conditional branch instructions.

The high order bits of a history vector 405 are combined, e.g., via a logical XOR operation, with the address of the current instruction block fetch, to form an index into a prediction array. In unit 460, an access of all possible array indexes to cover the uncertainty of the low order bits is initiated. It is appreciated that 460 accesses a greater quantity of prediction information than 160 of FIG. 1. As with the embodiment of FIG. 1, the array access takes a total of three cycles, e.g., units 460, 470 and 480. In contrast to the embodiment of FIG. 1, and in accordance with embodiments of the present invention, the array access is initiated concurrently with the instruction block fetch.

Since the array access is initiated concurrently with the instruction block fetch, the array contents are available not later than branch decode 440. It is appreciated that at branch decode 440, the remaining uncertainty can be resolved. For example, all previous branch instruction have been predicted, so the complete history is known. Further, the uncertainty of the number of branches is resolved by branch decode 440. Thus, prediction logic 490 can access the unique prediction information from the subset of array information already accessed in blocks 460-480. With the unique prediction, prediction logic 490 can predict any branches within the instruction block, and provide branch prediction information 450 to fetch unit 410.

In this novel manner, a history based branch prediction is provided earlier than under the conventional art, for example, in the same clock cycle as a branch decode operation. Beneficially, this reduces the cycle time of a branch prediction, and reduces the duration of a pipeline stall for branch taken predictions.

In addition, it is to be appreciated that embodiments in accordance with the present invention are capable of predicting multiple branches with a single access to a prediction array. Under the conventional art, history based branch prediction generally requires multiple accesses to a prediction array, either sequentially or via a multi-ported memory structure.

In an exemplary embodiment, a prediction array is constructed with a word size equal to the range of uncertainty, e.g., 32 bits. Consequently, the high order bits may select a word from the prediction array, and that word is accessed. The particular bit position within that word is identified when the uncertainty is resolved.

Figure 5:
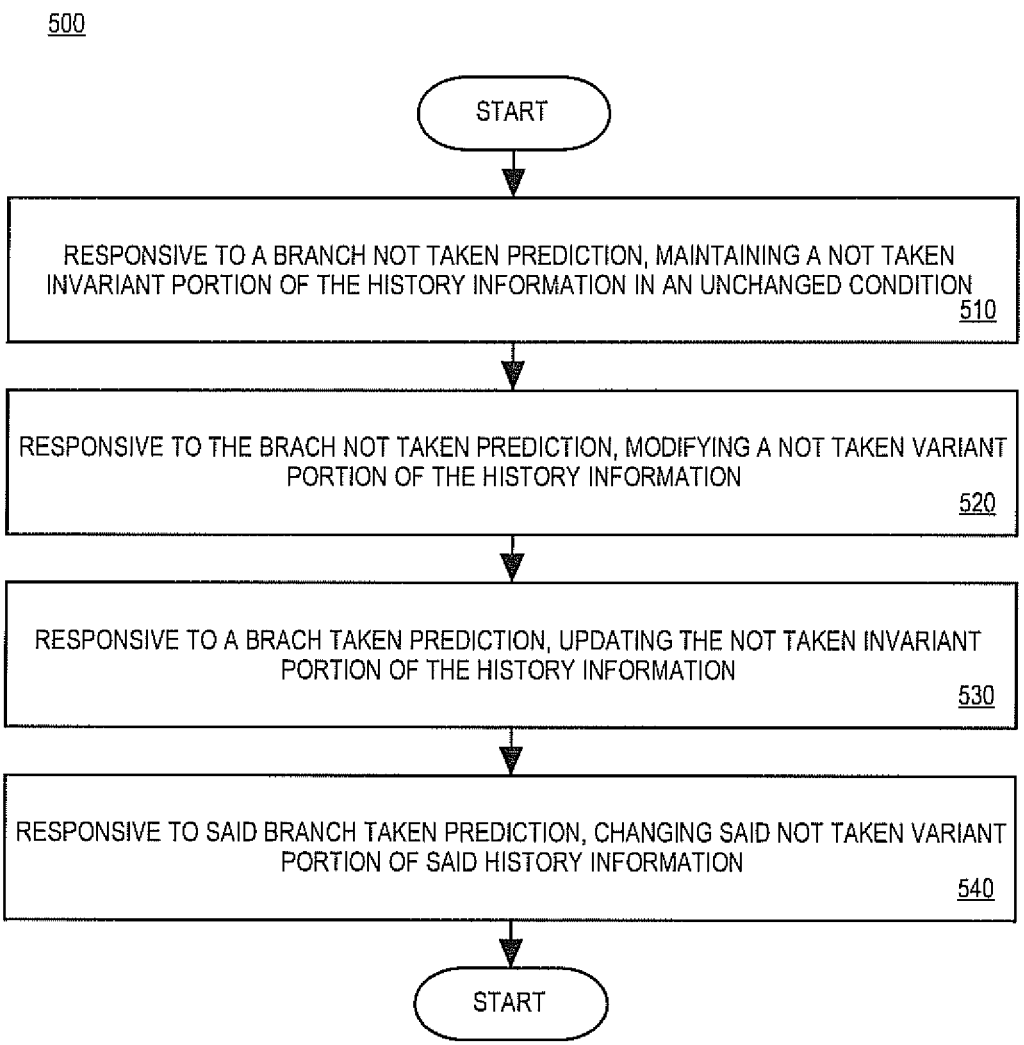
FIG. 5 illustrates an exemplary method of maintaining history information for a history based branch predictor, in accordance with embodiments of the present invention.

FIG. 5 illustrates an exemplary process 500 of maintaining history information for a history based branch predictor, in accordance with embodiments of the present invention. In step 510, responsive to a branch not taken prediction, a not taken invariant portion of the history information, e.g., shift field 210 (FIG. 2), is maintained in an unchanged condition. In step 520, responsive to a branch not taken prediction, a not taken variant portion of the history information, e.g., counting field 220 (FIG. 2), is modified. The not taken variant portion of the history information may count a number of not taken branch predictions.

In step 530, responsive to a branch taken prediction, a not taken invariant portion of the history information is modified. The modification may be a function the current contents of the not taken invariant portion of the history information and the not taken variant portion of the history information. For example, the contents of the not taken invariant portion of the history information may be shifted by a value of the not taken variant portion of the history information.

In optional step 540, responsive to the branch taken prediction, the not taken variant portion of the history information is changed. The change may include setting the not taken variant portion of the history information to a fixed value.

Embodiments in accordance with the present invention provide for systems and methods for history based pipelined branch prediction. Embodiments in accordance with the present invention also provide for improving a cycle time of history based predictions. Further, embodiments in accordance with the present invention provide for systems and methods for history based pipelined branch prediction that are compatible and complementary with existing systems and methods of processor design and branch prediction.

Various embodiments of the invention are thus described. While the present invention has been described in particular embodiments, it should be appreciated that the invention should not be construed as limited by such embodiments, but rather construed according to the below claims.

What is claimed is:

1. An apparatus comprising:
    a history based branch predictor circuit of a computer processor configured to initiate an access of prediction information to predict a plurality of branches within an instruction block prior to updating history information for all previous branches within the instruction block,
    wherein said history based branch predictor circuit is further configured to provide said prediction information to said predictor circuit not later than a clock cycle of said computer processor in which said plurality of branches are decoded.

2. The apparatus of claim 1 wherein said instruction block comprises at least two branch instructions.

3. The apparatus of claim 1 wherein an address of said prediction information comprises branch history information.

4. The apparatus of claim 3 wherein said branch history information comprises uncertainty as to actual history of branches.

5. The apparatus of claim 4 wherein said branch history information is encoded so as to limit the effect of said uncertainty on the amount of said prediction information that must be accessed.

6. The apparatus of claim 5 wherein said branch history information comprises a not taken invariant portion and a not taken variant portion taken of said branch history information.

7. The apparatus of claim 4 wherein said access to prediction information accesses more prediction information that is necessary to predict said plurality of branches based on said actual history of branches.

8. The apparatus of claim 7 wherein said more prediction information is a minimum set of information necessary to predict said plurality of branches in consideration of said uncertainty.

9. The apparatus of claim 1 wherein said access to prediction information to predict a plurality of branches within an instruction block is initiated in a same clock cycle of said computer processor as a fetch of said instruction block.

10. A processor comprising:
    a history based branch predictor circuit configured to predict at least two branches based on a single access to a single ported memory comprising prediction information.

11. The processor of claim 10 wherein the at least two branches are contained within a single instruction block.

12. The processor of claim 11 wherein the single access is initiated in a same clock cycle of the processor as a fetch of the instruction block.

13. The processor of claim 10 wherein the history based branch predictor circuit predicts the at least two branches not later than one clock cycle of the processor after the at least two branches are decoded.

14. The processor of claim 10 wherein the prediction information is indexed by a combination of branch history information and current branch address information.

15. The processor of claim 14 wherein the branch history information comprises uncertainty as to actual history of branches.

16. The processor of claim 15 wherein the branch history information is encoded so as to limit the effect of the uncertainty on the amount of the prediction information that must be accessed.

17. The processor of claim 16 wherein the branch history information comprises a not taken invariant portion and a not taken variant portion taken of the branch history information.

18. A method comprising:
accessing prediction information to predict a plurality of branches within an instruction block prior to updating history information for all previous branches within said instruction block; and
predicting at least one of said plurality of branches responsive to said accessing,
wherein said predicting occurs not later than a clock cycle of a computer processor in which said plurality of branches are decoded.

19. The method of claim 18 further comprising:
speculatively executing software based on said predicting at least one of said plurality of branches responsive to said accessing.

* * * * *